(No Model.) 3 Sheets—Sheet 1.

F. H. LAFORGE & H. J. BARKER.
FRICTION CLUTCH.

No. 398,628. Patented Feb. 26, 1889.

(No Model.) 3 Sheets—Sheet 2.
F. H. LAFORGE & H. J. BARKER.
FRICTION CLUTCH.
No. 398,628. Patented Feb. 26, 1889.
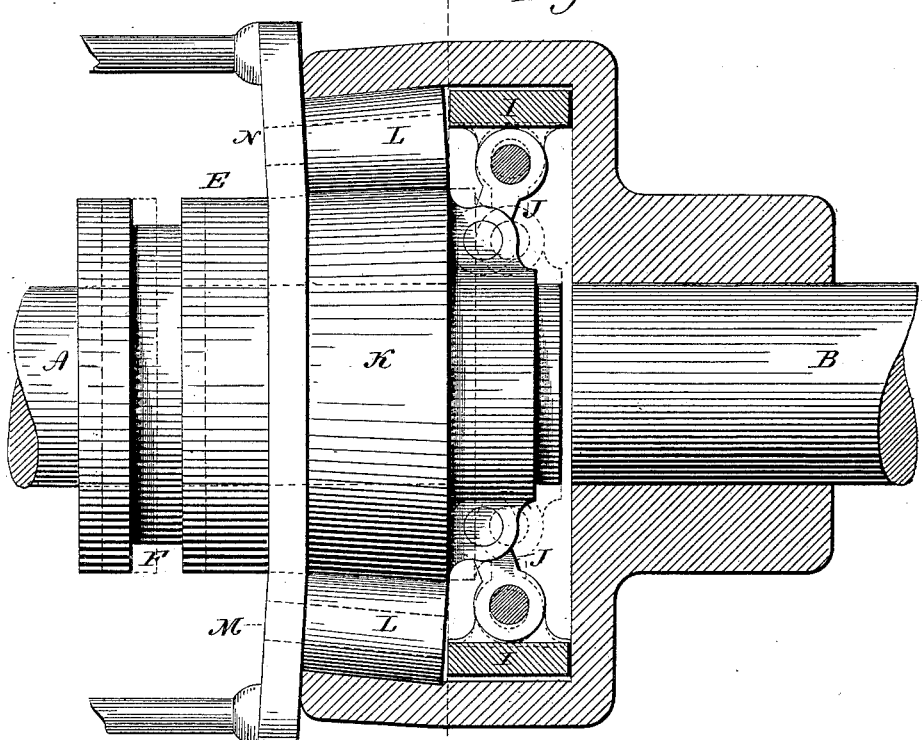
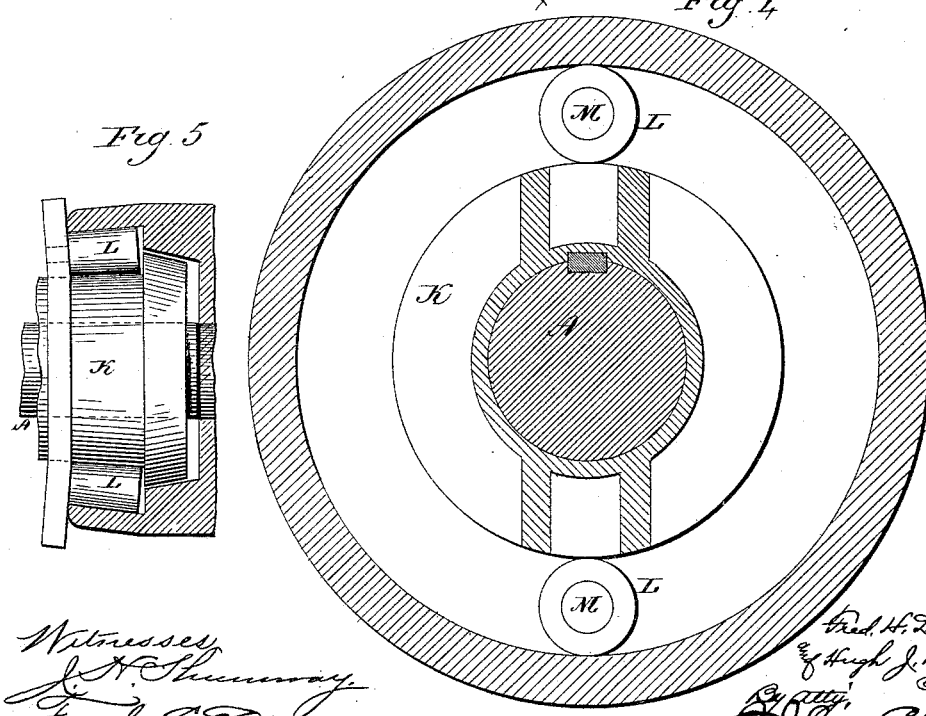

(No Model.) 3 Sheets—Sheet 3.

F. H. LAFORGE & H. J. BARKER.
FRICTION CLUTCH.

No. 398,628. Patented Feb. 26, 1889.

UNITED STATES PATENT OFFICE.

FREDERICK H. LAFORGE, OF WATERBURY, CONNECTICUT, AND HUGH J. BARKER, OF PHILADELPHIA, PENNSYLVANIA.

FRICTION-CLUTCH.

SPECIFICATION forming part of Letters Patent No. 398,628, dated February 26, 1889.

Application filed November 19, 1888. Serial No. 291,248. (No model.)

*To all whom it may concern:*

Be it known that we, FREDERICK H. LA-FORGE, of Waterbury, county of New Haven, State of Connecticut, and HUGH J. BARKER, of Philadelphia, in the county of Philadelphia and State of Pennsylvania, have invented a new Improvement in Friction-Clutches; and we do hereby declare the following, when taken in connection with accompanying drawings and the letters of reference marked thereon, to be a full, clear, and exact description of the same, and which said drawings constitute part of this specification, and represent, in—

Figure 1:
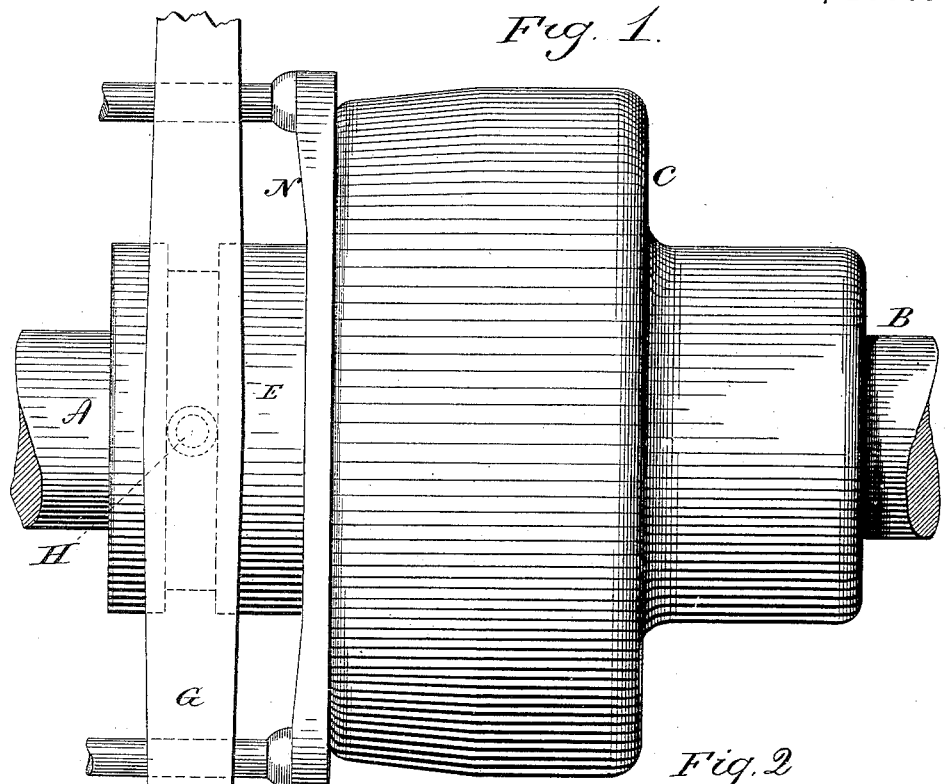
Figure 2:
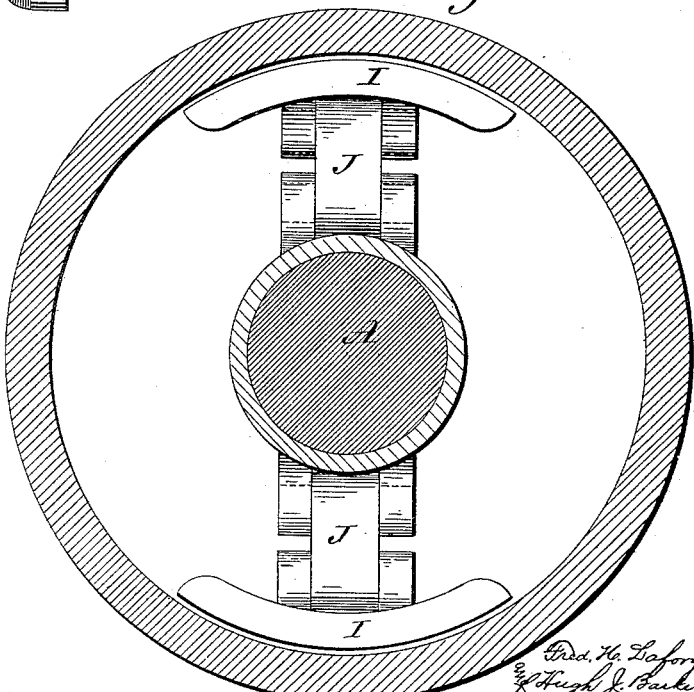
Figure 6:
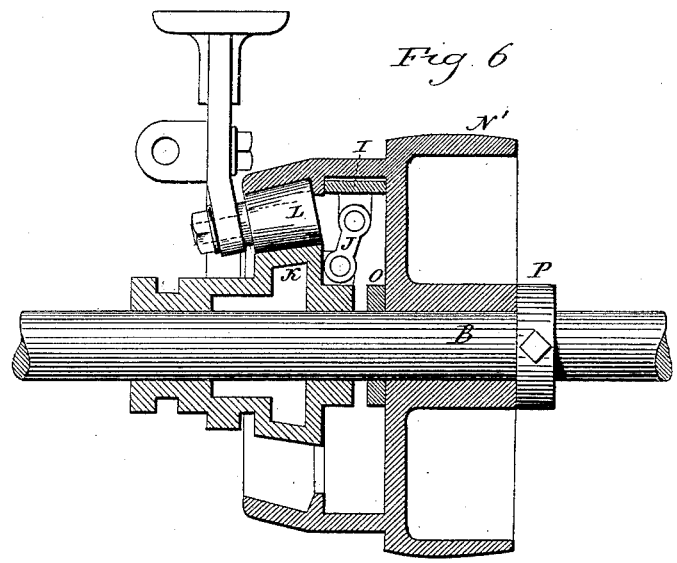
Figure 7:
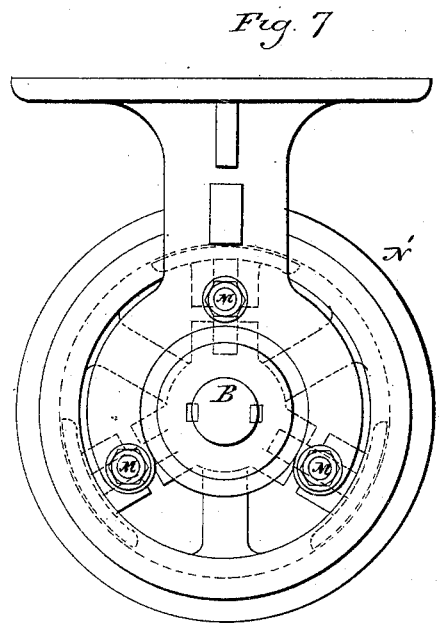

Figure 1, a top or plan view of the clutch and a portion of each shaft to which the parts are attached; Fig. 2, a transverse section on line $x\ x$ of Fig. 3, looking toward the shaft B, the said line cutting in a plane with the edge of the shoes I; Fig. 3, a longitudinal central section showing side view of the slide and the rollers between it and the head; Fig. 4, a transverse section on the same line, $x\ x$, as Fig. 2, but looking in the opposite direction; Fig. 5, a modification; Figs. 6 and 7, longitudinal section and end views showing a modification in the arrangement of the clutch.

This invention relates to an improvement in friction-clutches, having for its object to produce a rotation from the driven part of the clutch to a shaft, and so that, power being applied to the said driven part to give it a constant revolution in one direction, the clutch may engage the shaft to be driven, so as to impart to it a rotation in the same direction of the driven part of the clutch or in the reverse direction, as may be desired, and so that a forward or backward revolution may be imparted, as desired; and the invention consists of a clutch composed of two parts, one of which forms a head recessed upon one side to form a chamber, the walls of which chamber are concentric with the axis of the shaft upon which the said part is placed, the second part arranged to slide longitudinally upon the shaft and concentric with the said head, but yet connected with the shaft upon which it slides, so as to revolve therewith, the said slide provided with a friction-surface, which, under the longitudinal movement of the said slide, is forced against the interior wall of the chamber of the said head to make frictional contact therewith or withdrawn therefrom to release such contact, the said slide constructed with a concentric conical surface within the said chamber, the diminution in diameter of the conical surface being in the opposite direction to that required for the movement of the slide to engage its frictional surface directly with the said head, and the said conical surface being of smaller diameter than the adjacent walls of the said chamber, combined with rollers between the said conical surface of the slide and the corresponding surface of the walls of the chamber, and whereby, as the slide is moved in one direction, the said frictional surface of the slide will engage the said head and impart rotation thereto or receive rotation therefrom, as the case may be, in the same direction as that of the head; but when the said slide is moved in the opposite direction it will break the direct engagement between the slide and head, and the slide will thus engage the said rollers, which work in contact with both the said conical surface of the slide and the corresponding surface of the chamber, so that the direction of rotation of said head and slide will be opposite each other, as more fully hereinafter described.

In illustrating the invention we will first do so as applied to two independent shafts in line with each other, one of which is the driven shaft, and which may be considered as the driving-shaft of a steam-engine, and the other as a propeller-shaft, to which the rotation of the driving-shaft of the engine is to be imparted in one direction or the other, according to the movement of the boat required.

A represents one shaft—say the engine-shaft—to which power is applied to impart constant rotation in one direction. B represents the other shaft—say the propeller-shaft—which is in axial line with the shaft A, and which it is desirable shall revolve in either direction.

To the shaft B a head, C, is fixed, so as to become substantially a part of that shaft. This head is constructed with side walls, forming a chamber within the head concentric with the shaft B, which chamber surrounds the adjacent end of the driven shaft A.

On the shaft A a slide, E, is arranged, which is splined to the shaft, so as to positively revolve with the shaft A, but yet be free for longitudinal movement. The slide is constructed with an annular groove, F, by which the longitudinal movement is imparted to the slide. As here represented, such movement is imparted to the slide by means of a lever, G, from which a stud, H, extends into the groove F of the slide, and so that as the lever is moved in either direction it will correspondingly move the slide. This slide extends within the chamber of the head C.

Within the chamber friction-shoes I are arranged, one or more, the surface of which corresponds to the inner wall of the chamber, and so that they may be forced into frictional contact therewith or withdrawn from such frictional contact, substantially as in well-known friction-clutches.

The shoes are connected to the slide E by means of links J, hinged to the slide and to the shoes, as seen in Figs. 2 and 3, the links standing oblique to a transverse plane through the axis. Consequently as the slide is moved in one direction—say to the right, Fig. 3—the links will approach the said right-angular plane and cause the shoes to come into firm contact with the interior surface of the chamber of the head C, as seen in broken lines, Fig. 3, but when moved in the opposite direction the shoes will be withdrawn, as indicated in Figs. 2 and 3, so as to disengage the head C from the said shoes. The shaft A being driven, the engagement of the shoes with the head C, as before described, causes the shaft B to partake of the revolution of the shaft A in the same direction so long as the shoes shall be thus engaged; but upon the disengagement of the shoes the shaft B will cease its revolution, while the shaft A will continue its revolution, substantially as in well-known friction-clutches.

The slide E is constructed with a conical concentric surface, K, within the chamber, the larger diameter inward or toward the shoes. The diameter of this conical portion K of the slide is considerably less than the diameter of the chamber of the head, and so as to leave a concentric space between the conical surface of the slide and the inner surface of the wall of the chamber. That portion of the wall of the chamber which corresponds to the conical surface of the slide K diminishes in diameter outward to a somewhat greater extent than the diminution in diameter of the conical surface K of the slide, and so that the space between the said conical portion K of the slide and the corresponding portion of the wall of the chamber forms an annular space around the conical portion K, the sides of that space converging outwardly, as shown.

Between the conical portion K of the slide and the corresponding surface of the walls of the chamber rollers L (one or more) are arranged upon axles M, these axles being supported in a stationary position, here represented as by a frame, N, outside the head surrounding the slide, as seen in Fig. 3. This frame is supported from the adjacent framework, so as to remain stationary irrespective of the rotation of either of the shafts. (See also Figs. 6 and 7.) The rollers are of conical shape, diminishing in diameter outward and correspond to the adjacent surfaces of the conical portion K of the slide and the corresponding portion of the wall of the chamber. This conical shape of the rollers is necessary, in order that the rollers may travel smoothly and without rubbing on the surface of the conical portion of the slide and the corresponding surface of the head. The position of the rollers L is such that they remain in substantially constant contact with the inner wall of the chamber, as seen in Fig. 3, and so that when the slide K is withdrawn to disengage the shoes I, as seen in Fig. 3, the conical portion K will be brought to a forcible bearing against the said rollers L L, and so that the revolution of the slide carrying this conical portion K will be imparted to the said rollers L; and because of the contact of the said rollers L with the inner surface of the chamber of the head the rotation of the rollers will be imparted to the said head, and thence to the other shaft. The rotation imparted to the rollers is in the opposite direction to the revolution of the shaft K, as indicated by arrows in Fig. 4, and the reverse of what the revolution would be when the shoes are in contact with the head, as before described. When the slide is moved, as indicated in broken lines, Fig. 3, to bring the shoes into working contact with the head, the portion K is, because of its conical shape, withdrawn from contact with the rollers L, leaving the head and its shaft independent of the action of the conical portion K of the slide. An intermediate position between the two points indicated in Fig. 3 will of course leave the head free from engagement with the slide, and consequently the shaft B will remain stationary, while the shaft A will continue its revolution.

It will be understood that the power may be applied to either shaft, the result being the same. In the one case the slide becomes the driver between the two shafts, and in the other the head becomes the driver. As thus applied to the connection of one shaft with another in line therewith, as in a propeller, the operation is as follows: If it is desirable to stop the propeller-wheel from revolving, the slide is brought to its intermediate position. (Indicated by the lever in Fig. 1.) If then it is desired that the propeller-wheel shall revolve in the same direction as the driven shaft A, the slide is moved to bring the shoes I into engagement with the head, when the rotation will be imparted to the shaft B in the same direction as the shaft A. Now, if it be desired to reverse the direction of the propeller, the slide is withdrawn to disengage the shoes I and the conical portion K is brought between the rollers L, and so as to impart rotation thereto, the result of which is that the shaft B will be caused to revolve in the opposite direction to that of the driven shaft B.

Various devices are known in the art for making friction connection between the slide on one shaft and the chamber of the head on the other shaft, whereby the rotation imparted to both shafts will be in the same direction—such, for illustration, as a conical surface on the slide, which will engage a corresponding surface in the head, as seen in Fig. 5. We therefore do not wish to be understood as limiting the invention to the particular connection between the shoes and the slide or to the necessary employment of shoes, although we prefer such shoes as illustrated as being effective.

The illustration which we have thus made will be sufficient to enable others skilled in the art to apply the invention to two shafts in line, one of which is to be employed to drive the other. We will now describe the invention as applied to a shaft in which the power for rotating the shaft is to be derived through a belt or its equivalent, so that the rotation of the said shaft may be made in either direction. This modification of the invention is illustrated in Figs. 6 and 7, the same letters indicating the same parts, the shaft B in this case being the shaft which is to be driven and upon which the clutch mechanism is arranged. The head is formed as a part of the pulley N′—that is, the chamber within which the clutch mechanism operates is in the form of a flange on the pulley, which flange forms the chamber described in the first illustration. The pulley is arranged loose upon the shaft, but held longitudinally by collars O P on the shaft, so as to prevent longitudinal movement of the pulley, while it revolves freely on the shaft as an axle. The slide is splined to the shaft, as in the first illustration. In this case the entire clutch is arranged upon the same shaft instead of upon two independent shafts in line with each other, as first described. Power being applied to the pulley N′, a constant rotation in one direction will be imparted thereto, but without necessarily communicating that revolution to the shaft; but if the slide be moved in one direction, as in the first illustration, the frictional engagement between the slide and pulley will be made as before, and when the slide is moved in the opposite direction that frictional engagement will be broken and the rollers will come into action the same as before. In the first case the shaft will be driven in the same direction as the pulley. In the other case the rotation of the shaft will be in the opposite direction to that of the pulley.

The mechanism which we have thus illustrated for applying the power through a pulley or its equivalent is adapted for use upon counter-shafts for driving lathes, where sometimes it is desired that the lathe shall run in one direction and other times in the opposite direction, and will be sufficient to enable others skilled in the art to apply the reversing-clutch to other purposes.

We claim—

1. The combination of a driven shaft and a shaft to be driven, the two shafts being in axial line with each other, a head made fast to one of said shafts, the said head constructed with a concentric chamber, into which the other shaft extends, a longitudinal slide on said other shaft secured to said other shaft and so as to revolve therewith, but free for longitudinal movement thereon, the said slide provided with a surface within said chamber corresponding to and adapted to frictionally engage or disengage said slide and head, according to the direction of movement of said slide, the said slide also constructed with a conical concentric surface within said chamber diminishing in diameter in the direction in which the slide moves to disengage its frictional surface from said head, said conical surface being of smaller diameter than the internal diameter of said chamber, that portion of the surface of said chamber which surrounds said conical portion of the slide being concentric with the said conical surface, with rollers arranged upon stationary axles between the conical surface of said slide and the corresponding surface of the said chamber, substantially as described, and whereby the movement of the said slide in one direction engages the said head, so as to impart rotation to the shaft with which the head is connected in the same direction as that of the other shaft, and when the slide is moved in the opposite direction the slide disengages the said connection with the said head, and the conical surface of the slide engages the said rollers, and thereby imparts a rotation to the said head and its shaft in the direction opposite to that of the said other shaft.

2. The combination of a driven shaft and a shaft to be driven, the two shafts being in axial line with each other, a head made fast to one of said shafts, the said head constructed with a concentric chamber, into which the other shaft extends, a longitudinal slide on the said other shaft secured to said other shaft so as to revolve therewith, but free for longitudinal movement thereon, one or more shoes within said chamber and presenting a surface or surfaces corresponding to the surface of the wall of said chamber, the said shoes being in connection with the said slide, so that the longitudinal movement of the slide will impart corresponding radial movement to said shoes, the said slide constructed with a conical concentric surface diminishing in diameter in the direction in which the slide moves to retract the said shoes, said conical surface of smaller diameter than the internal diameter of said chamber, that portion of the surface of the said chamber which surrounds the said conical portion of the slide being concentric with the said conical surface, with rollers arranged upon stationary axles between the conical surface of said slide and the corresponding surface of the said chamber, substantially as described, and whereby the movement of the said slide in one direction applies the shoes to the said head to impart rotation to the shaft with which the head is connected in the same direction as that of the other shaft, and when the slide is moved in the opposite direction disconnects said shoes from the head, and the conical surface of the slide engages the said rollers, and thereby imparts a rotation to the said head and its shaft in the direction opposite to that of the said other shaft.

3. The herein-described friction-clutch, consisting of a head arranged upon a shaft and forming a concentric chamber around said shaft, combined with a longitudinal slide concentric with said chamber and arranged upon a shaft for longitudinal movement, but engaged with said shaft circumferentially, the said slide provided with a surface within said chamber corresponding to and adapted to frictionally engage or disengage said slide and head, according to the direction of movement of said slide, the said slide also constructed with a conical concentric surface within said chamber diminishing in diameter in the direction in which the slide moves to disengage its frictional surface from said head, said conical surface of smaller diameter than the internal diameter of the said chamber, that portion of the surface of said chamber which surrounds said conical portion of the slide being concentric with the said conical surface, with rollers arranged upon stationary axles between the conical surface of said slide and the corresponding surface of the said chamber, substantially as and for the purpose described.

FREDERICK H. LAFORGE.
HUGH J. BARKER.

Witnesses for Laforge:
WM. MOSES,
F. H. AUSTIN.
Witnesses for Barker:
E. S. HALL,
W. A. PAULDING.